(12) United States Patent
Sala

(10) Patent No.: US 9,242,695 B2
(45) Date of Patent: Jan. 26, 2016

(54) BRAKE LEVER REACH ADJUSTMENT

(71) Applicant: TIEN HSIN INDUSTRIES CO., LTD., Taichung (TW)

(72) Inventor: Alfredo Sala, Taichung (TW)

(73) Assignee: Tien Hsin Industries Co., Ltd., Taichung (TW)

( * ) Notice: Subject to any disclaimer, the term of this patent is extended or adjusted under 35 U.S.C. 154(b) by 0 days.

(21) Appl. No.: 14/300,340

(22) Filed: Jun. 10, 2014

(65) Prior Publication Data

US 2015/0353164 A1    Dec. 10, 2015

(51) Int. Cl.
*G05G 1/04* (2006.01)
*B62L 3/02* (2006.01)

(52) U.S. Cl.
CPC . *B62L 3/02* (2013.01); *Y10T 74/206* (2015.01)

(58) Field of Classification Search
CPC ...... G05G 23/02; G05G 1/04; F16H 59/0278; B62L 3/00; B62L 3/02
See application file for complete search history.

(56) References Cited

U.S. PATENT DOCUMENTS

| | | | | |
|---|---|---|---|---|
| 4,222,285 A * | 9/1980 | Kine | ............................ | 74/480 R |
| 4,425,819 A * | 1/1984 | Shimano | ......................... | 74/489 |
| 4,459,871 A * | 7/1984 | Shimano | ..................... | 74/480 R |
| 4,611,500 A * | 9/1986 | Nagano | ........................... | 74/489 |
| 4,945,785 A * | 8/1990 | Romano | ...................... | 74/502.2 |
| 7,793,565 B2 * | 9/2010 | Orrico et al. | ................. | 74/502.2 |
| 8,161,840 B2 * | 4/2012 | Nago | ............................ | 74/502.2 |
| 2008/0229863 A1 * | 9/2008 | Orrico et al. | .................... | 74/491 |

* cited by examiner

*Primary Examiner* — Vicky Johnson
(74) *Attorney, Agent, or Firm* — Rosenberg, Klein & Lee

(57) ABSTRACT

A brake lever reach adjustment includes a bracket, a brake lever and a reach adjusting assembly. The bracket to be mounted to a handlebar has a cavity therein. The brake lever is pivotally connected to the bracket, and defines two opposite wings. The reach adjusting assembly is disposed in the cavity of the bracket. The reach adjusting assembly has a lead screw and a movable block mounted about the lead screw. Specifically, the movable block selectively supports one of the two wings or is positioned between the two wings to adjust a position of the brake lever relative to the handlebar.

8 Claims, 7 Drawing Sheets

BRAKE LEVER REACH ADJUSTMENT

BACKGROUND

1. Field of the Invention

The present invention relates to a bicycle brake lever, and more particularly, to a brake lever reach adjustment.

2. Description of Related Art

Generally, a bicycle brake lever is usually mounted on a bicycle handlebar for controlling a brake device. Typically, the distance between the brake lever and the handlebar, known as the reach, is fixed and is set to accommodate an average-sized hand. Accordingly, a fixed-reach lever may be positioned too far from the handlebar for a rider with smaller hands to comfortably reach.

A conventional reach-adjustable lever assembly is mounted to a handlebar for actuating one of a gear-change and braking device. The lever assembly includes a lever with a finger grip pivotally connected to a housing and a reach adjust mechanism. The reach adjust mechanism includes a cam and a cam actuator. The cam actuator is rotatably supported by one of the housing and the lever. The cam is threaded into the cam actuator and is configured to engage the other of the housing and the lever. The cam is movable upon rotation of the cam actuator to press the lever to position the finger grip relative to the handlebar.

The conventional reach-adjustable lever assembly is operated by means of bolt which is disposed on a back of the housing. However, the bolt of the conventional reach-adjustable lever assembly is exposed out of the housing, which causes the housing lack of aesthetic. Even though the bolt could be covered under a rubber hood to prevent the housing from being moisturized by rain or sweat, the rubber hood needs to be unwrapped once the bolt needs to be operated.

The present invention has arisen to mitigate and/or obviate the disadvantages of the conventional reach adjustment of brake lever.

SUMMARY

The main objective of the present invention is to provide an improved reach adjustment of brake lever.

To achieve the objective, a brake lever reach adjustment includes a bracket, a brake lever and a reach adjusting assembly. The bracket to be mounted to a handlebar has a cavity therein. The brake lever is pivotally connected to the bracket, and defines two opposite wings. The reach adjusting assembly is disposed in the cavity of the bracket. The reach adjusting assembly includes a lead screw and a movable block mounted about the lead screw. The movable block selectively support one of the two wings or is located in between the two wings to adjust a position of the brake lever relative to the handlebar.

Specifically, the movable block has a first supporting face and a second supporting face respectively formed with different inclinations and distances from an axis of the lead screw. The movable block is selectively positioned in a first position where the first supporting face of the movable block supports one of the two wings of the brake lever, a second position where the second supporting face of the movable block supports the other wing of the brake lever, and a third position where the movable block is located between the two wings of the brake lever while the two wings supported by the lead screw. Furthermore, the movable block has a positioning portion against an inner wall of the cavity to restrict a rotation of the movable block.

Moreover, the lead screw has a driving head and the frame body has a bore for accommodating the driving head of the lead screw. The reach adjusting assembly further has a retaining ring. The driving head of the lead screw has an annular groove in which the retaining ring is positioned to retain the lead screw.

Further benefits and advantages of the present invention will become apparent after a careful reading of the detailed description with appropriate reference to the accompanying drawings.

DETAILED DESCRIPTION OF THE INVENTION

Figure 1:
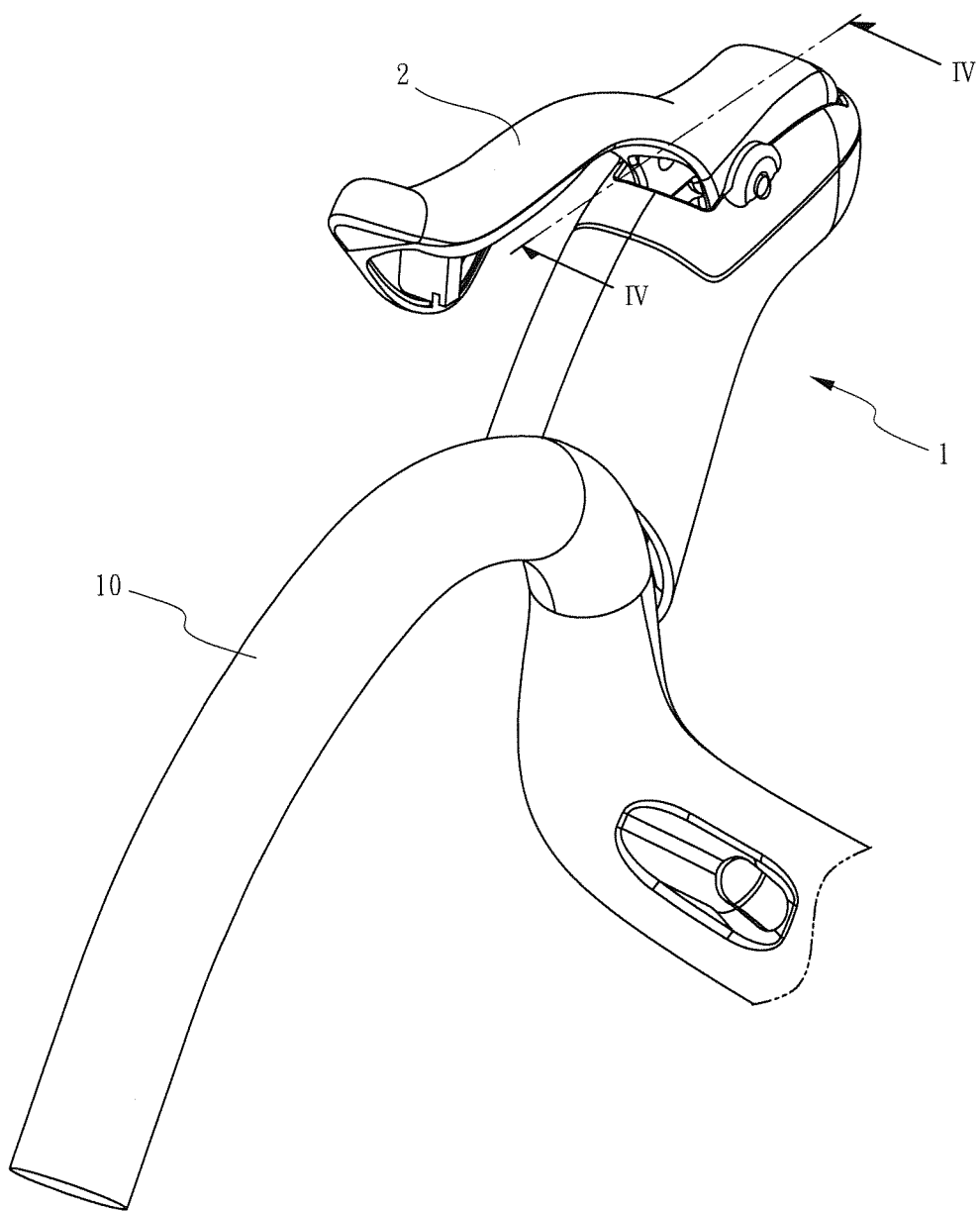
FIG. 1 is a perspective view of a brake lever reach adjustment in accordance with a preferred embodiment of the present invention.
Figure 2:
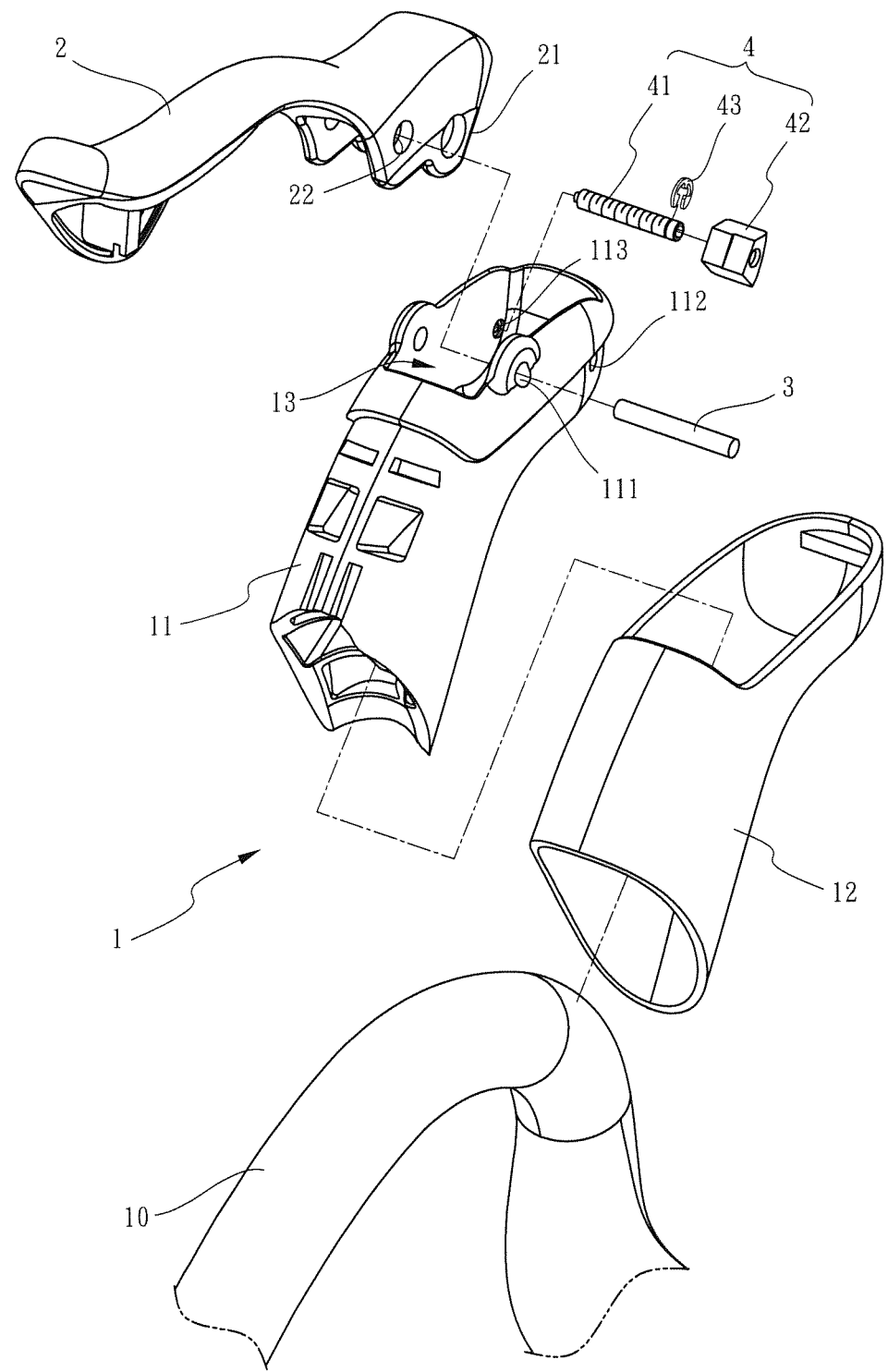
FIG. 2 is an exploded perspective view of the brake lever reach adjustment shown in FIG. 1.
Figure 3:
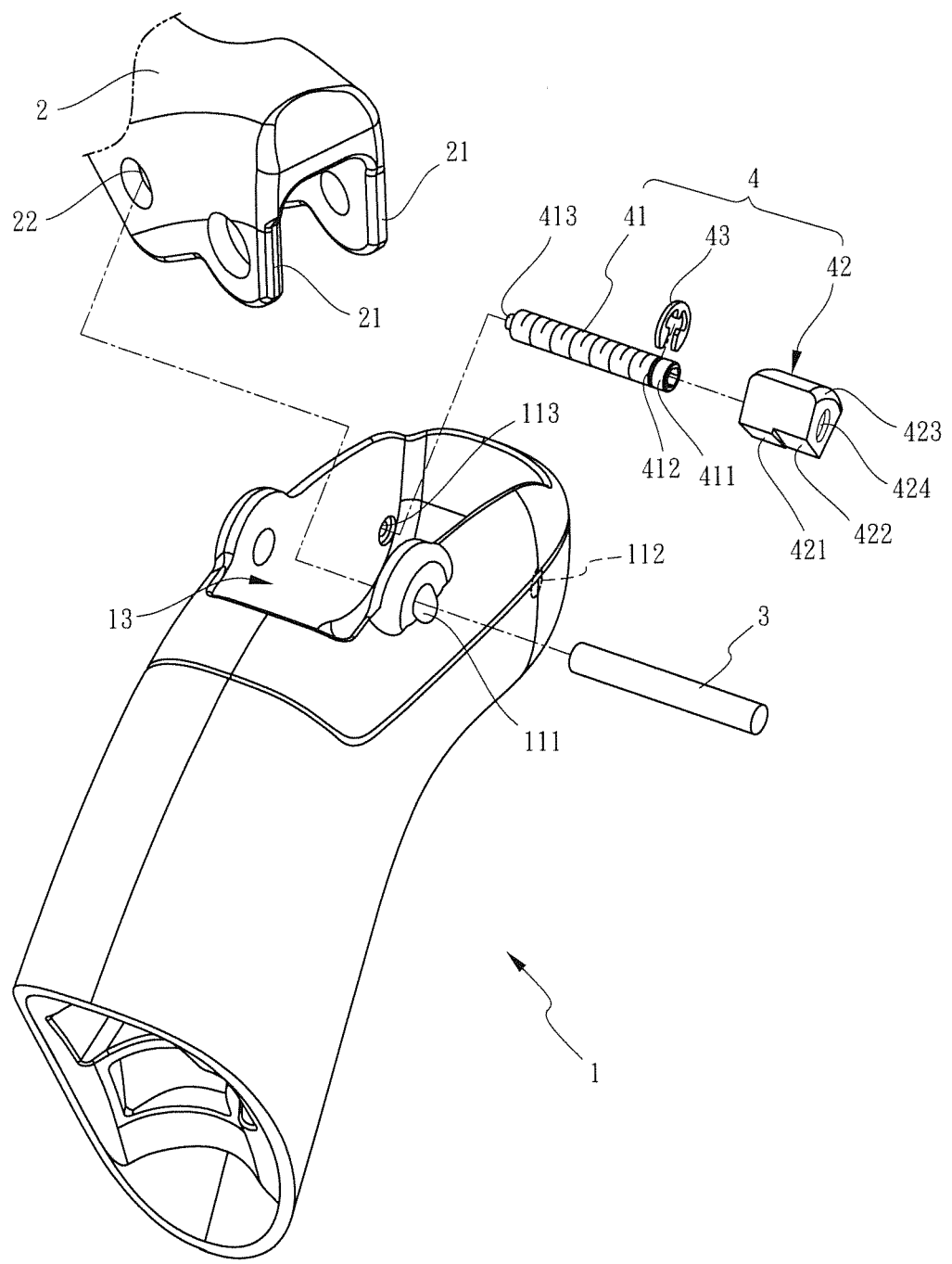
FIG. 3 is a partial enlarged exploded perspective view of the brake lever reach adjustment of the present invention.

Referring to FIGS. 1-3, a brake lever reach adjustment in accordance with a preferred embodiment of the present invention includes a bracket 1, a brake lever 2 and a reach adjusting assembly 4. The bracket 1 is mounted to a handlebar 10, and has a cavity 13 therein. The brake lever 2 is pivotally connected to the bracket 1 by a pivot 3, and has two opposite wings 21 extending from an upper portion of the brake lever 2. The reach adjusting assembly 4 is disposed in the cavity 13 of the bracket 1. The reach adjusting assembly 4 comprises a lead screw 41 and a movable block 42 mounted about the lead screw 41.

Under this arrangement, the movable block 42 is removable relative to the lead screw 41. Thus, the movable block 42 could be adjusted to support the left wing 21, the right wing 21 or be located between the two wings 21 of the brake lever 2 so as to adjust a position of the brake lever 2 relative to the handlebar 10.

Figure 5:
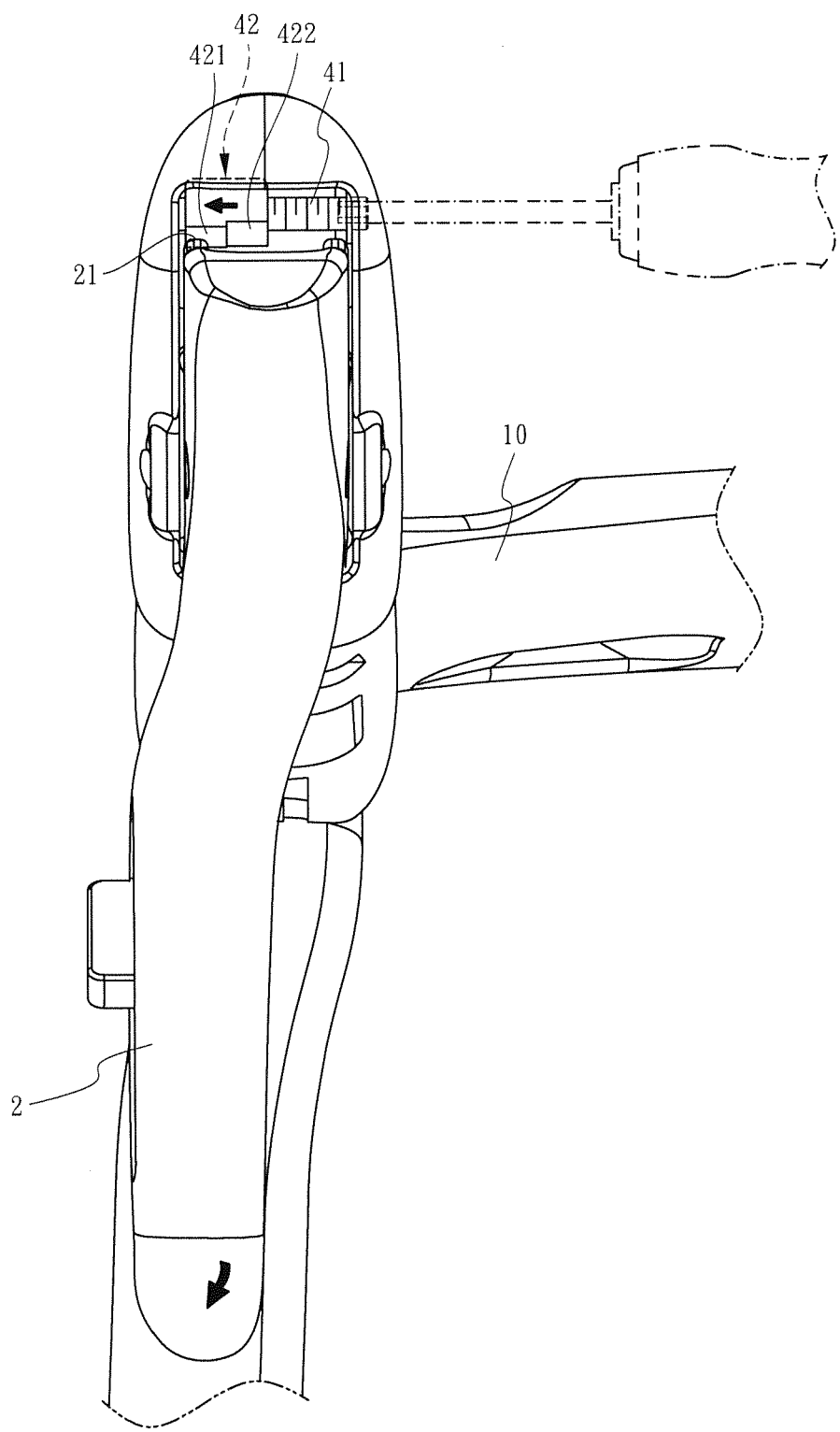
FIG. 5 illustrates that the movable block is positioned in the first position.
Figure 6:
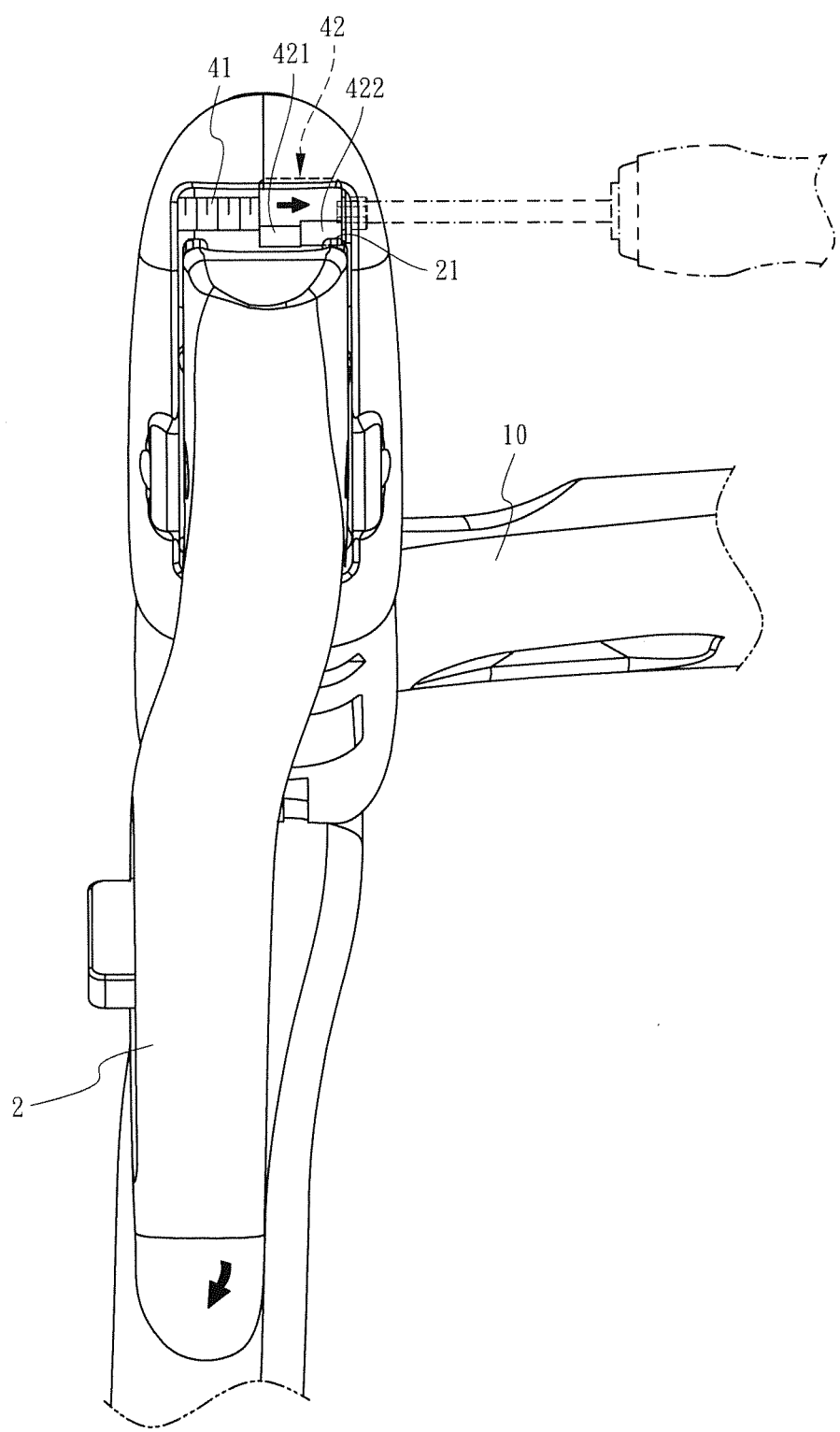
FIG. 6 illustrates that the movable block is positioned in the second position.
Figure 7:
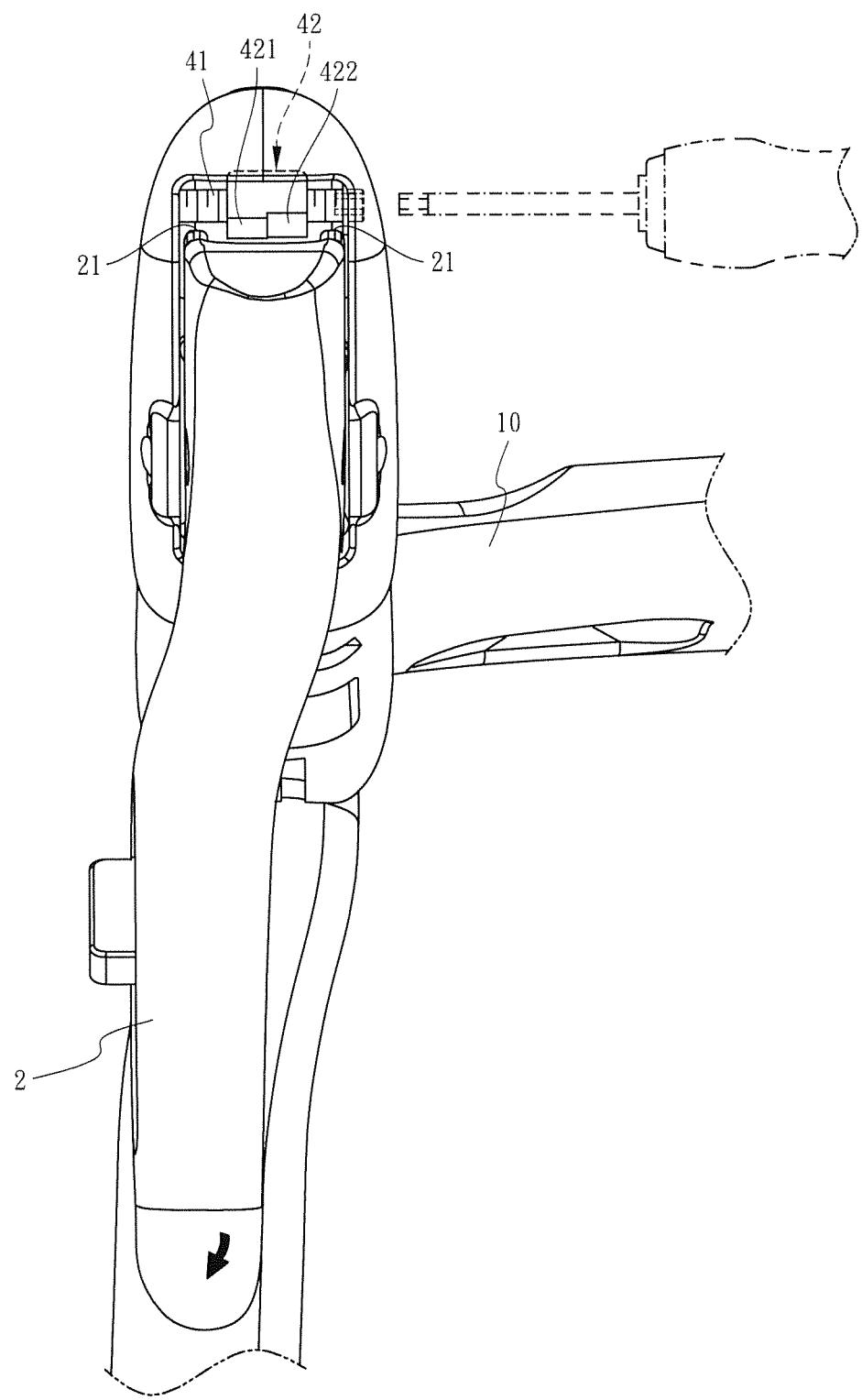
FIG. 7 illustrates that the movable block is positioned in the third position.

In operation, as shown in FIGS. 5-7 and referring to FIG. 3, the movable block 42 is operated to selectively position in a first position, a second position and a third position. The movable block 42 has a first supporting face 421 and a second supporting face 422 adjacent to the first supporting face 421. The first and second supporting faces 421, 422 of the movable block 42 are respectively formed with different inclinations and distances from an axis of the lead screw 41. In the preferred embodiment of the present invention, the first supporting face 421 is slightly higher than the second supporting face 422.

In the first position, as shown in FIG. 5, the movable block 42 is moved to left and an edge of the left wing 21 will be supported by the first supporting face 421 such that a reach of the brake lever 2 is in a small position. In the second position, as shown in FIG. 6, the movable block 42 is moved to right and an edge of the right wing 21 will be supported by the second supporting face 421 such that the reach of the brake lever 2 is in a medium position. In the third position, as shown in FIG. 7, the movable block 42 is located between the two wings 21 of the brake lever 2 and the two wings 21 will be supported by the lead screw 41 such that the reach of the brake lever 2 is in a large position.

Figure 4:
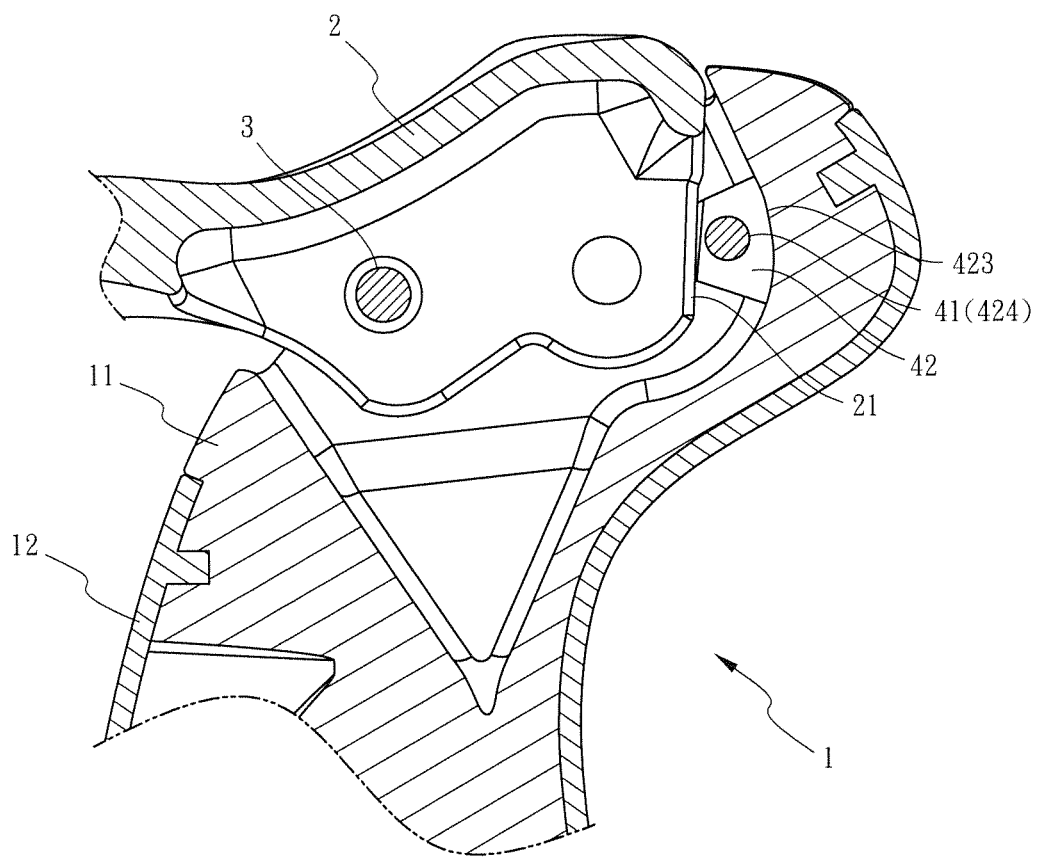
FIG. 4 is a partial cross-sectional view of the brake lever reach adjustment along line IV-IV of FIG. 1.

As shown in FIG. 4 and referring to FIG. 3, the movable block 42 has a positioning portion 423 against an inner wall of the cavity 13 to restrict a rotation of the movable block 42. Therefore, the movable block 42 could be movable relative to the lead screw 41 with the first supporting face 421 and the second supporting face 422 facing the same orientation. In detail, the movable block 42 has a threaded hole 424 therethrough for accommodating the lead screw 41 so that the movable block 42 is movable relative to the lead screw 41 by rotation of the lead screw 41.

Referring to FIG. 2, the bracket 1 has a frame body 11 in which the cavity 13 is defined and a housing 12 mounted around the frame body 11. The frame body 11 has a pair of through holes 111 and the brake lever 2 has a pair of pivot holes 22 for accommodating the pivot 3. Furthermore, the lead screw 41 has a driving head 411 and the frame body 11 has a bore 112 for accommodating the driving head 411 of the lead screw 41.

Specifically, as shown in FIG. 3, the reach adjusting assembly 4 further has a retaining ring 43. The driving head 411 of the lead screw 41 has an annular groove 412 in which the retaining ring 43 is positioned to retain the lead screw 41. In addition, the lead screw 41 has a protrusion 413 opposite to the driving head 411. The frame body 11 has a recess 113 in a side wall of the cavity 13 for accommodating the protrusion 413 of the lead screw 41.

There are some advantages of the present invention. The brake lever reach adjustment of present invention provides clear positions related to different reaches, which is intuitive to use. In addition, the lever reach adjustment of the present invention is more convenient to be operated from outside of the housing 12.

Although the invention has been explained in relation to its preferred embodiment, it is to be understood that many other possible modifications and variations can be made without departing from the scope of the invention as hereinafter claimed.

What is claimed is:

1. A brake lever reach adjustment, comprising:
    a bracket to be mounted to a handlebar, the bracket having a cavity therein;
    a brake lever pivotally connected to the bracket and having two opposite wings; and
    a reach adjusting assembly disposed in the cavity, and having a lead screw and a movable block movably mounted to the lead screw, the movable block selectively supporting one of the two wings or positioned between the two wings, to adjust the reach of the brake lever relative to the handlebar, when the movable block is positioned between the two wings, the two wings are supported by the lead screw.

2. The brake lever reach adjustment as claimed in claim 1, wherein the movable block has a first supporting face and a second supporting face adjacent to the first supporting face; and the movable block is selectively positioned in a first position where the first supporting face of the movable block supports one of the two wings of the brake lever, a second position where the second supporting face of the movable block supports the other wing of the brake lever, and a third position where the movable block is positioned between the two wings of the brake lever while the two wings stop against the lead screw.

3. The brake lever reach adjustment as claimed in claim 2, wherein the first and second supporting faces are respectively formed with different inclinations and distances from an axis of the lead screw, and the movable block has a positioning portion against an inner wall of the cavity to restrict a rotation of the movable block.

4. The brake lever reach adjustment as claimed in claim 1, wherein the movable block has a threaded hole therethrough for accommodating the lead screw so that the movable block is removable relative to the lead screw by rotation of the lead screw.

5. The brake lever reach adjustment as claimed in claim 1, further comprising a pivot for connecting the brake lever to the bracket, wherein the bracket has a frame body in which the cavity is defined and a housing mounted around the frame body; the frame body has a pair of through holes and the brake lever has a pair of pivot holes for accommodating the pivot.

6. The brake lever reach adjustment as claimed in claim 5, wherein the lead screw has a driving head and the frame body has a bore for accommodating the driving head of the lead screw.

7. The brake lever reach adjustment as claimed in claim 6, wherein the reach adjusting assembly further has a retaining ring, and the driving head of the lead screw has an annular groove in which the retaining ring is positioned to retain the lead screw.

8. The brake lever reach adjustment as claimed in claim 6, wherein the lead screw has a protrusion opposite to the driving head, and the frame body has a recess in a side wall of the cavity for accommodating the protrusion of the lead screw.

* * * * *